May 29, 1962  N. J. STODDARD ET AL  3,036,423

METHOD OF MAKING LIVELY THERMOPLASTIC YARN

Original Filed Jan. 4, 1954  4 Sheets-Sheet 1

INVENTORS:
NICHOLAS J. STODDARD
WARREN A. SEEM

BY *Howson & Howson*

ATTYS.

May 29, 1962  N. J. STODDARD ET AL  3,036,423
METHOD OF MAKING LIVELY THERMOPLASTIC YARN
Original Filed Jan. 4, 1954  4 Sheets-Sheet 3

INVENTORS:
NICHOLAS J. STODDARD
WARREN A. SEEM
BY Howson & Howson
ATTYS.

INVENTORS:
NICHOLAS J. STODDARD
WARREN A. SEEM
BY Howson & Howson
ATTYS.

United States Patent Office 3,036,423
Patented May 29, 1962

3,036,423
**METHOD OF MAKING LIVELY THERMO-
PLASTIC YARN**
Nicholas J. Stoddard, Berwyn, and Warren A. Seem,
Chester Springs, Pa., assignors, by mesne assignments,
to Universal Winding Company, Cranston, R.I., a corporation of Massachusetts
Original application Jan. 4, 1954, Ser. No. 401,951, now
Patent No. 2,803,109, dated Aug. 20, 1957. Divided
and this application Aug. 8, 1957, Ser. No. 677,149
1 Claim. (Cl. 57—157)

This invention relates to thermoplastic yarns such as nylon, vinyon, Orlon, Velon, Dacron, saran, and the like (as distinguished from silk, rayon, cotton, linen or wool, etc.), and is a division of our application Serial No. 401,951, filed January 4, 1954 (now Patent No. 2,803,-109).

Thermoplastic yarns of the kind referred materially respond to shrinking by becoming more ductile or plastic and thermally stabilized in cooling which, after subjected to the action of heat assume new and substantially permanent physical characteristics when twisted, stretched or shrunk while heated. The invention is especially concerned with the production of monofilament yarns having useful active and latent torsional force permanently imparted thereto.

The above objective is broadly realized through the utilization of our method of thermally processing fully disclosed in a separate U.S. application Serial No. 401,-803, filed January 4, 1954 (now Patent No. 2,803,108), in combination with our herein disclosed method of utilizing the apparatus of the attached drawings, wherein.

Figure 4:
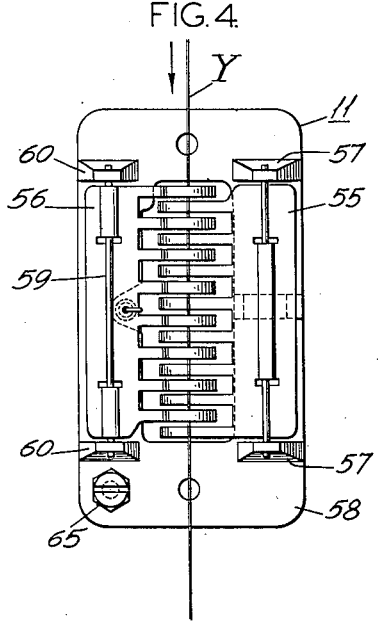
Figure 5:
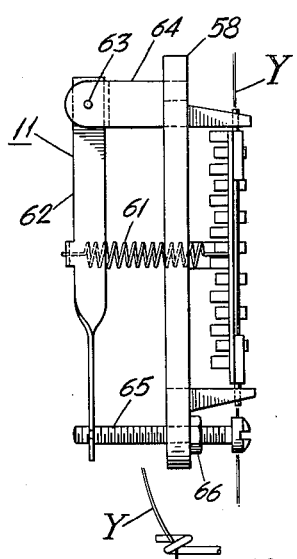
Figure 6:
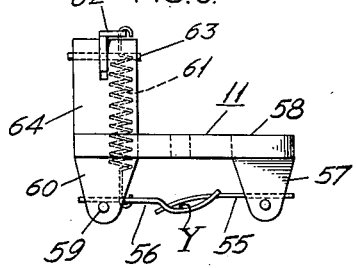
Figure 7:
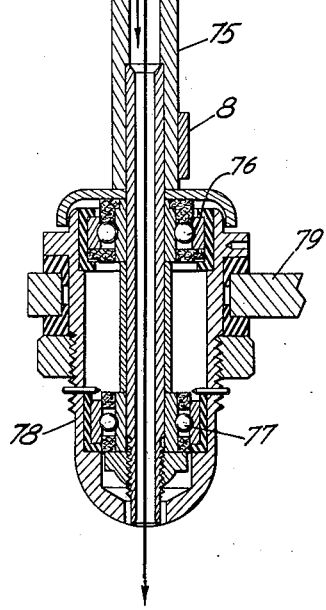

FIGS. 4, 5 and 6 respectively, are a front view, a side elevation and a top plan view likewise drawn to a larger scale, of a specially constructed tensioning device embodied in the apparatus; and FIG. 7 is a large scale axial sectional view of a specially constructed twisting and untwisting spindle also embodied in the apparatus.

Figure 1:
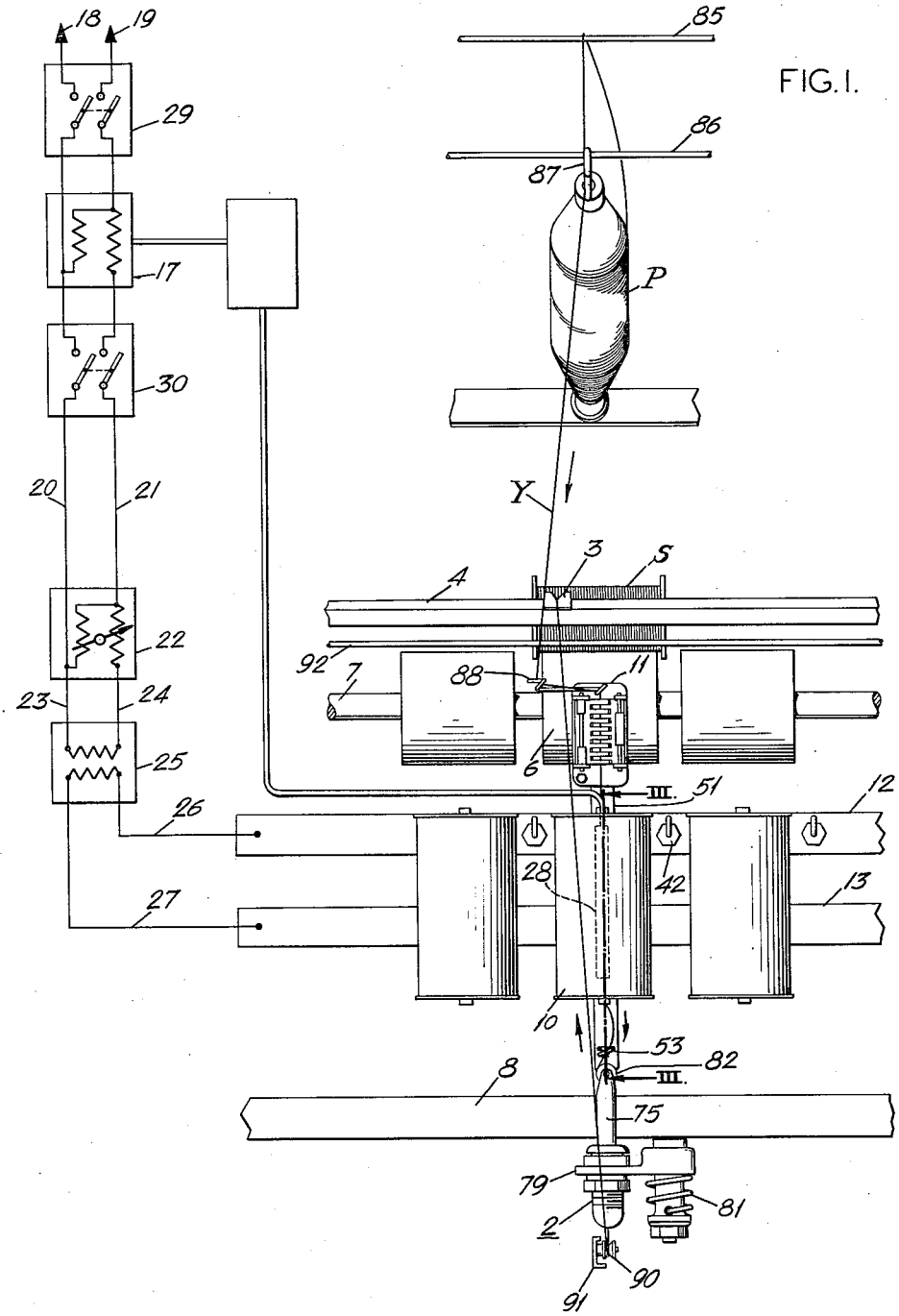
FIG. 1 is a fragmentary view, in front elevation of one form of apparatus suitable for carrying out our improved method of producing thermoplastic yarns having various improved physical characteristics.
Figure 2:
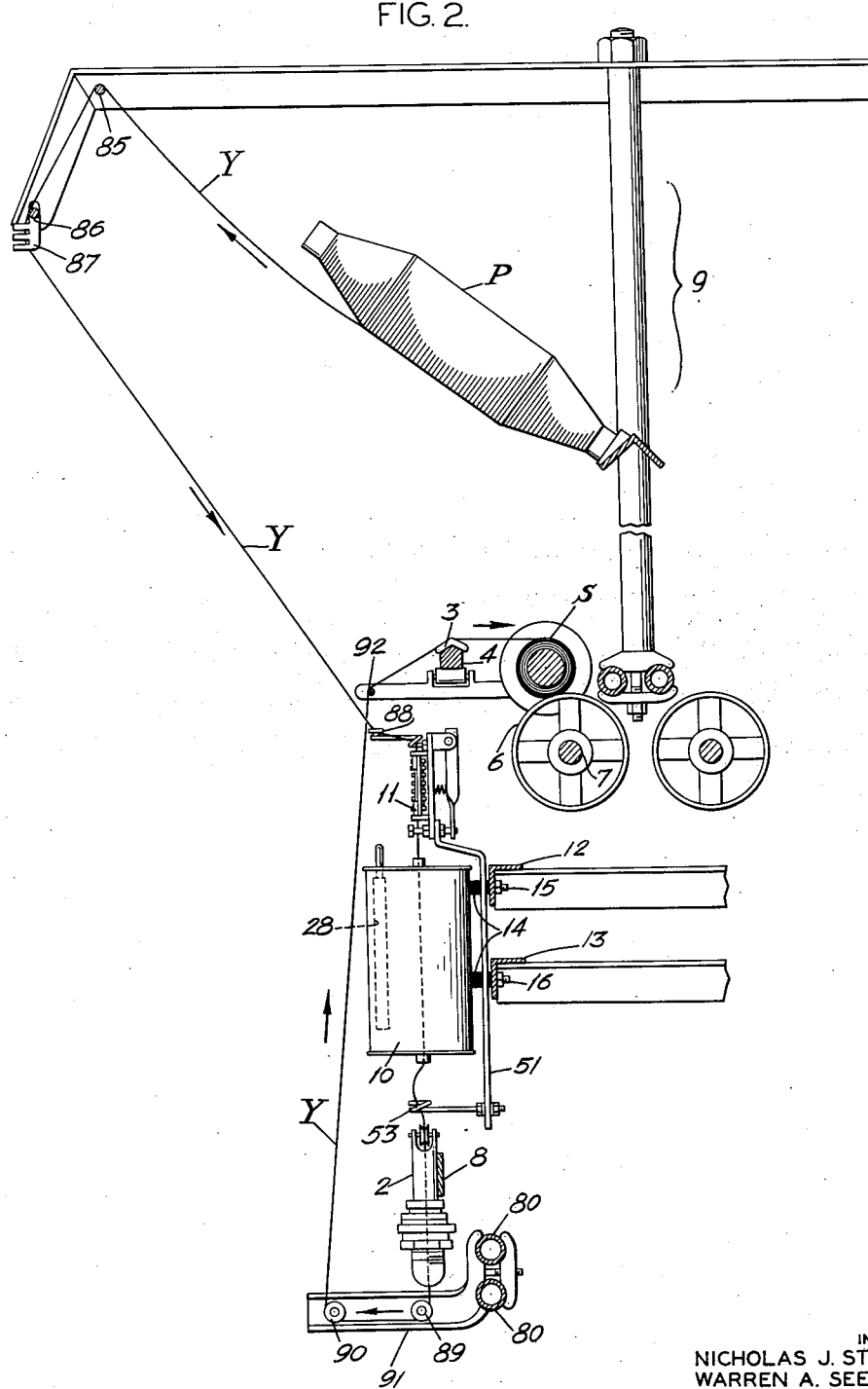
FIG. 2 is a fragmentary view of the apparatus of FIG. 1 in cross section.

Referring to FIGS. 1 and 2 of the drawings, there is shown apparatus which is basically known in the textile art as an "up-twister" such as is ordinarily employed in twisting yarns. One of the usual guides for distributing the processed yarn upon the corresponding revolving take-up spool S is indicated at 3, the usual traverse bar for the guide at 4, the usual roll for driving the spool at 6, the usual driven shaft for the roll at 7, and the usual spindle driving belt at 8.

A special overhead creel 9 is provided for supporting the package P of thermoplastic yarn Y which is to be processed along with a specially constructed heating device 10, a specially constructed yarn tensioning device 11, and a specially constructed twisting and untwisting spindle 2. As shown, the heating device 10 and the tensioning device 11 are vertically arranged, the latter above the former, in the vertical interval between the spindle 2 and the take-up spool S.

Figure 3:
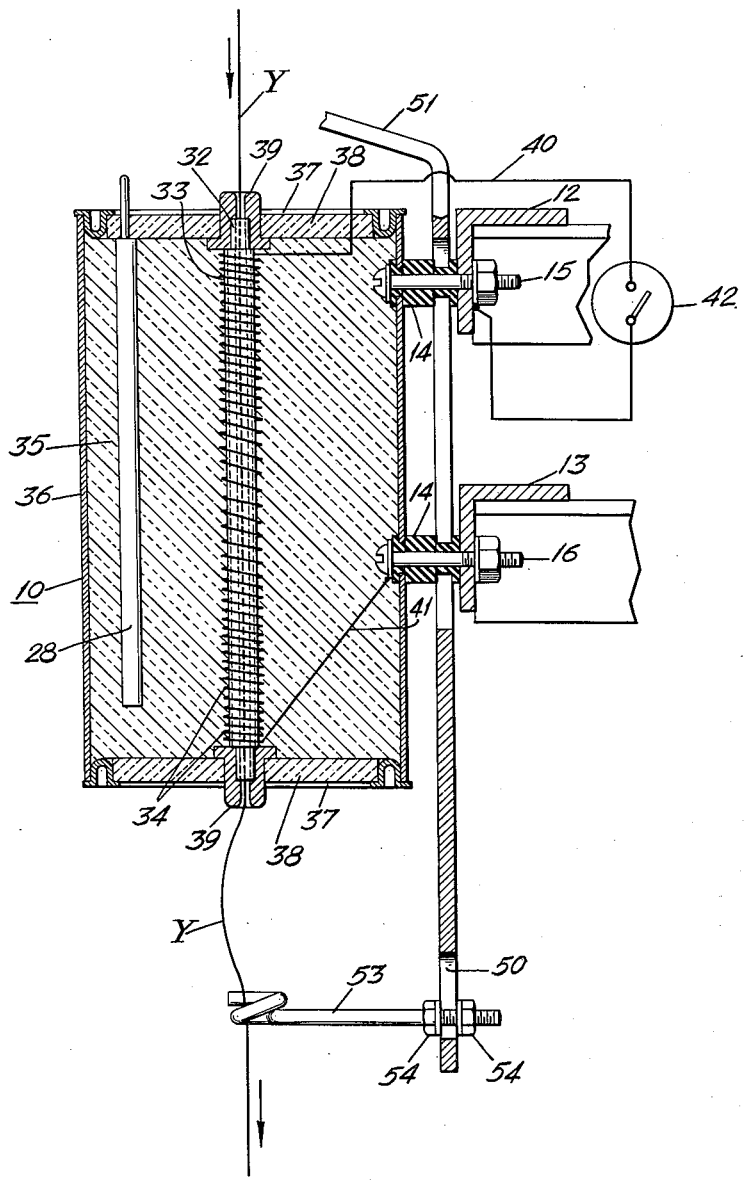
FIG. 3 is a fragmentary view in section taken as indicated by the angled arrows III—III in FIG. 1, drawn to a larger scale and showing a specially constructed heating unit embodied in the apparatus.

As later on explained, the device 10 is electrically heated, current being conducted to it through two fixed horizontally-arranged bus bars 12 and 13 whereto said device is secured, with interposition of insulating bushings 14 as shown in FIGS. 2 and 3, by screws 15 and 16. The required degree of heat is uniformly maintained in the device by current at a constant voltage (not exceeding twenty-four volts for personal safety) through an automatic induction voltage regulator 17 from a power line 18, 19, said regulator being connected by conductors 20, 21 to a manually-adjustable induction voltage regulator 22 connected, in turn, by conductors 23, 24 to the primary of a step down transformer 25 in circuit through conductors 26, 27 with the bus bars 12, 13.

The output voltage of the induction voltage regulator 17 is automatically governed by a thermally responsive sensing means 28 incorporated in the heating device 10. The automatic and manual induction voltage regulators 17 and 22 and the thermostatic sensing means 28 may all be of any approved standard commercially available types through cooperation of which the temperature in the heating device 10 is modulated compensatively with changes in ambient or room temperature and the rate of transfer of heat therefrom to the yarn travelling thereto. Also included in the lines 18, 19 and 20, 21 respectively, are manually operable safety hand switches 29 and 30.

With reference now to FIG. 3, it will be seen that the heating device comprises a central tube 32 which, it is to be understood, is of non-ferrous material and of small diameter and bore, and through which the yarn Y is passed; said tube being provided exteriorly with a thin coat 33 of glass or other insulating material, and surrounded by a coil 34 of resistance wire. As further shown, tube 32 is embedded in a thick walled jacket 35 of thermal insulation, which may be of fiber glass or the like, encased in a metallic shell 36. At its opposite end the shell 36 is closed by sealed covers 37 which may also be of metal, with interposition between them and the insulation, of disks 38 formed from "transite" or the like to minimize thermal transfer from the hot tube through said shell to the exterior and vice versa. Engaged over the opposite ends of tube 32 and extending through the disks 38, are hard wear-resistant bushings 39 of porcelain or the like which prevent cutting of the tube by the passing yarn.

It is to be particularly noted that the winding pitch of heating coil 34 increases progressively from the bottom end of tube 32 at which the yarn enters to the mid-height of the tube, and then progressively decreases at a corresponding rate toward the end at which the yarn emerges. Accordingly, a greater amount of electrical energy is available at the entrant and the exit ends of tube 32, thereby insuring uniform heat distribution and making possible the use of a much shorter tube than otherwise would be required. The lead 40 from one end of the coil 34 is extended through the insulating jacket 35 to screw 15, and the lead 41 from the other end of said coil to the screw 16, and interposed in lead 40 is a manually operable switch which is diagrammatically indicated at 42. The tensioning means 11 is supported at the upper end of a vertical bracket bar 51 which is secured to the bus bars 12 and 13 by the screws 15 and 16 and insulated therefrom by the bushings 14. The pigtail guide indicated at 53 has its shank extending through a vertical slot 50 in the lower end of the upright bracket bar 51 so as to be vertically adjustable in the interval between the heating device 10 and the spindle 2, said guide being securable in adjusted positions by the clamp nuts indicated at 54.

As shown in FIGS. 4, 5 and 6, the tensioning device 11 comprises two comb-like vanes 55 and 56 between the alternating tines of which the yarn Y is passed. Vane 55 is fixedly supported between a pair of vertically-spaced forwardly-projecting lugs 57 of a bracket plate 58, while vane 56 is swingable about a hinge pin 59 between another pair of vertically-spaced forwardly-projecting lugs 60 of said plate. The swingable vane 56 is connected by a tension spring 61 to a vertical lever 62 fulcrumed at 63 on a rearward projection 64 at the top of the plate 58. The lower or distal end of lever 62 bears against a screw 65 threadedly engaged in plate 58. By means of screw 65, it is possible to vary the force of the spring 61 and, in turn, the pressure exerted by the wing 56 upon the yarn Y to regulate the drag or tension imparted thereto. The jam nut at 66 serves as a means for securing the screw 65 against accidental displacement in adjusted position.

As shown in FIG. 7, the spindle 2 comprises an upright tube 75 of small diameter and bore which is rotatively supported at its lower end by a pair of vertically-spaced anti-friction ball bearings 76 and 77. These bearings are housed within a cylindric holder 78 set into a retractable arm 79 which is swingably connected in the usual manner from the fixed horizontal rods 80 in the lower part of the apparatus, and which is normally maintained in the position shown by a torsion spring 81 with the tube in tangential contact with the driving belt 8. Freely revolvable about a transverse pin at the upper end of the tube 75 is a small inset V grooved reverse twisting roller 82 around which the yarn Y is wrapped one or more times before passing downward through the tube. Being of small diameter and thin walled, the spindle tube 75 is light in weight and dynamically balanced, and can therefore be revolved at high speeds by the contacting drive belt 8 as will be readily understood.

The thermoplastic Y yarn to be processed is drawn endwise from the supply package P on the creel 9, passed over guide rods 85, 86 and a guide eye 87 also on the creel, then downwardly to a pigtail guide 88 provided on plate 58 of the tensioning device 11, then down between the wings of the tensioning device 11 and through the tube 32 of heating device 10, then through the pigtail guide 53, then through the spindle 2, then horizontally under a pair of spaced rolls 89 and 90 on a bracket arm 91 reaching forward from the rods 80, then upwardly over a fixed longitudinal guide rod 92 to the traverse guide 3, and finally to the driven take-up spool S.

We have herein described and shown in the drawings a conventional up-twister converted to carry out our methods of processing, but any type of twisting machine may be similarly converted or a machine specially constructed for the purpose. The essential elements of apparatus for producing the yarn are (1) a yarn supply creel, (2) a restricted isolated heated zone capable of regulation to uniformly heat a travelling yarn up to the melting point of the yarn, (3) means for cooling the heated yarn; (4) a yarn tensioning means capable of adjustment to uniformly apply correlated yarn tension up to the breaking point of the yarn, (5) a driven twisting-untwisting spindle such as herein described, and (6) a driven take-up package.

For the purposes of illustration, let it be assumed that the yarn Y is in the form of a continuous monofilament of nylon or the like. As the yarn continually passes down through the heating device 10 it is uniformly heated to a temperature within twenty degrees of the melting point of the thermoplastic. This temperature is predetermined by adjustment of the manual induction voltage regulator 22 in accordance with the uniform linear speed at which it is travelled, the temperature being automatically modulated compensatively with changes in ambient or room temperature and the rate of transfer of heat to the travelling yarn by action of the sensing means 28 upon the automatic induction voltage regulator 17, and the device 11 being adjusted to maintain the yarn under uniform tension correlated to the temperature to which the yarn is heated and the linear speed of travel of the yarn.

While in a heated plastic state, the yarn is twisted and heat-set in one direction as it traverses the restricted heated zone of the heating device 10 by the action of the rapidly revolving spindle 2. Subsequent cooling is effected by ballooning as the yarn advances downward in the interval between the outlet end of the tube 32 of said heating device and the wheel 82, the yarn being wrapped for positive control, one or more times about the small wheel 82 of the untwisting spindle 2 as previously explained, and the cooling being promoted by contact of the yarn with the face of the wheel 82 and the smooth sloping groove sides of said wheel. By action of the transverse rotation or movement of the wheel 82, the yarn is reversely twisted as it loses frictional contact with wheel 82 and passes down through the tube 75 of the spindle to the guide wheel 89 and after rounding the latter and the guide wheel 90, it travels upward and after passing over the rod 92 and the traverse guide 3 it is continually taken up by the revolving spool S.

As a result of this continuous processing by means of which the yarn is twisted and heat-set and then twisted in the reverse direction monofilament yarn is produced which is delustered and has permanently set or imparted therein useful active and latent torsional force. By this is meant that the yarn is yarn-set, that is, the molecules in the thermoplastic yarn are permanently and uniformly reoriented or realigned therein according to the twisted formation of the yarn at the time of yarn-setting so that the yarn has an inherent tendency to twist uniformly and assume the twisted formation which it had at the time of yarn-setting.

We claim:

The method of making monofilament thermoplastic yarn having permanent active and latent torsional forces therein which comprises, continually drawing a monofilament thermoplastic yarn from a supply, continuously twisting the yarn in one direction, continually passing the yarn at a selected linear speed under uniform tension through a restricted thermally isolated and uniformly heated zone to uniformly heat the yarn to a prescribed temperature to reorient the molecules of the yarn to the twisted formation of the yarn and yarn-set the same, controlling the supply of heat energy to said zone to thereby maintain said heated zone uniformly at the temperature required to uniformly heat said yarn to said prescribed temperature, continually cooling the yarn to stabilize the same after passage under tension through said heated zone, and continually untwisting the yarn after cooling the same to establish therein permanent active and latent torsional forces providing an inherent tendency for the yarn to twist and assume the formation which it had at the time of yarn-setting.

References Cited in the file of this patent
UNITED STATES PATENTS

| | | |
|---|---|---|
| 2,089,199 | Finlayson et al. | Aug. 10, 1937 |
| 2,295,593 | Miles | Sept. 15, 1942 |
| 2,584,944 | Tilles | Feb. 5, 1952 |
| 2,736,945 | Burleson et al. | Mar. 6, 1956 |
| 2,743,511 | Genovese | May 1, 1956 |
| 2,772,191 | Burleson | Nov. 27, 1956 |
| 2,777,276 | Klein | Jan. 15, 1957 |
| 2,803,109 | Stoddard et al. | Aug. 20, 1957 |
| 2,863,280 | Ubbelohde | Dec. 9, 1958 |

UNITED STATES PATENT OFFICE
CERTIFICATE OF CORRECTION

Patent No. 3,036,423                        May 29, 1962

Nicholas J. Stoddard et al.

It is hereby certified that error appears in the above numbered patent requiring correction and that the said Letters Patent should read as corrected below.

In the grant, lines 2 to 4, for "assignors, by mesne assignments, to Universal Winding Company, of Cranston, Rhode Island, a corporation of Massachusetts," read -- assignors, by mesne assignments, to Leesona Corporation, a corporation of Massachusetts, --; line 13, for "Universal Winding Company, its successors" read -- Leesona Corporation, its successors --; in the heading to the printed specification, lines 5 to 7, for "assignors, by mesne assignments, to Universal Winding Company, Cranston, R. I., a corporation of Massachusetts" read -- assignors, by mesne assignments, to Leesona Corporation, a corporation of Massachusetts --.

Signed and sealed this 25th day of December 1962.

(SEAL)
Attest:

ERNEST W. SWIDER                              DAVID L. LADD

Attesting Officer                                   Commissioner of Patents